(12) United States Patent
Förster et al.

(10) Patent No.: US 6,304,977 B1
(45) Date of Patent: Oct. 16, 2001

(54) FIELD BUS ARRANGEMENT

(75) Inventors: Karl-Heinz Förster, Commack; Robert Conde, Coram, both of NY (US)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/528,729

(22) Filed: Mar. 20, 2000

Related U.S. Application Data

(63) Continuation of application No. 08/946,400, filed on Oct. 7, 1997, now Pat. No. 6,041,415.

(51) Int. Cl.[7] ............................... G06F 1/26; H02J 13/00
(52) U.S. Cl. .............................................. 713/300; 307/38
(58) Field of Search ..................... 713/300, 310, 713/324; 710/131; 363/50; 323/271; 340/644, 652; 307/38, 115, 85, 126, 43, 140; 361/601, 683, 99, 120, 189, 190; 700/286; 251/129.01

(56) References Cited

U.S. PATENT DOCUMENTS

| | | |
|---|---|---|
| 4,027,208 | 5/1977 | Look . |
| 4,055,772 | 10/1977 | Leung . |
| 4,312,035 | 1/1982 | Greene . |
| 4,574,355 | 3/1986 | Beatty et al. . |
| 4,604,557 * | 8/1986 | Cowles . |
| 4,760,276 | 7/1988 | Lethellier . |
| 4,837,455 * | 6/1989 | Sleator . |
| 4,902,901 | 2/1990 | Pernyeszi . |
| 5,467,241 | 11/1995 | Sugitani et al. . |
| 5,519,636 | 5/1996 | Stoll et al. . |
| 5,696,695 | 12/1997 | Ehlers et al. . |
| 5,699,830 | 12/1997 | Hayashi et al. . |
| 5,915,666 | 6/1999 | Hayashi et al. . |
| 5,918,629 | 7/1999 | Hayashi et al. . |
| 6,041,415 * | 3/2000 | Forster et al. . |

FOREIGN PATENT DOCUMENTS

| | | |
|---|---|---|
| 3631477 A1 | 9/1986 | (DE) . |
| 42266882 A1 | 8/1992 | (DE) . |
| 2 123 589 B | 6/1983 | (GB) . |
| HEI 4-346534 | 12/1992 | (JP) . |
| HEI 5-211683 | 8/1993 | (JP) . |

OTHER PUBLICATIONS

SEMI S2–93A, "Safety Guidelines for Semiconductor Manufacturing Equipment", SEMI (1991).
SEMI E24–92, "Cluster Tool Module Interface: Isolation Valve Interlocks Standard", SEMI (1992).
Gebaudesystemtechnik mit instabus EIB Katalog I 2.44, Siemens, (1994).
Neuheiten zu Teilkatalog II Interbus, Phoenix Contact, Apr. 1994.
Gebaudesystemtechnik mit *instabus* EIB Katalog I 2.44, Siemens, (1995).
Hubert Eing, M.S., Dipl.–Ing., et al.I *Das lokale SP–Netzwerk*, Elektronik, vol. 11, Jun. 3, 1983, at 73, 73–78.

* cited by examiner

*Primary Examiner*—Gopal C. Ray
(74) *Attorney, Agent, or Firm*—Hoffmann & Baron, LLP

(57) ABSTRACT

A field bus arrangement comprising at least one field bus station adapted to be connected with a serial field bus and furthermore at least one load controlled by way of a control output of the field bus station, the load being connected with a power supply line provided in addition to the lines of the field bus. The controlled switch is able to be actuated via the control output of the field bus station. The power circuits are completely decoupled, this meaning for example that the load can be switched off both by way of the field bus station itself and also by switching off the power supply line.

10 Claims, 1 Drawing Sheet

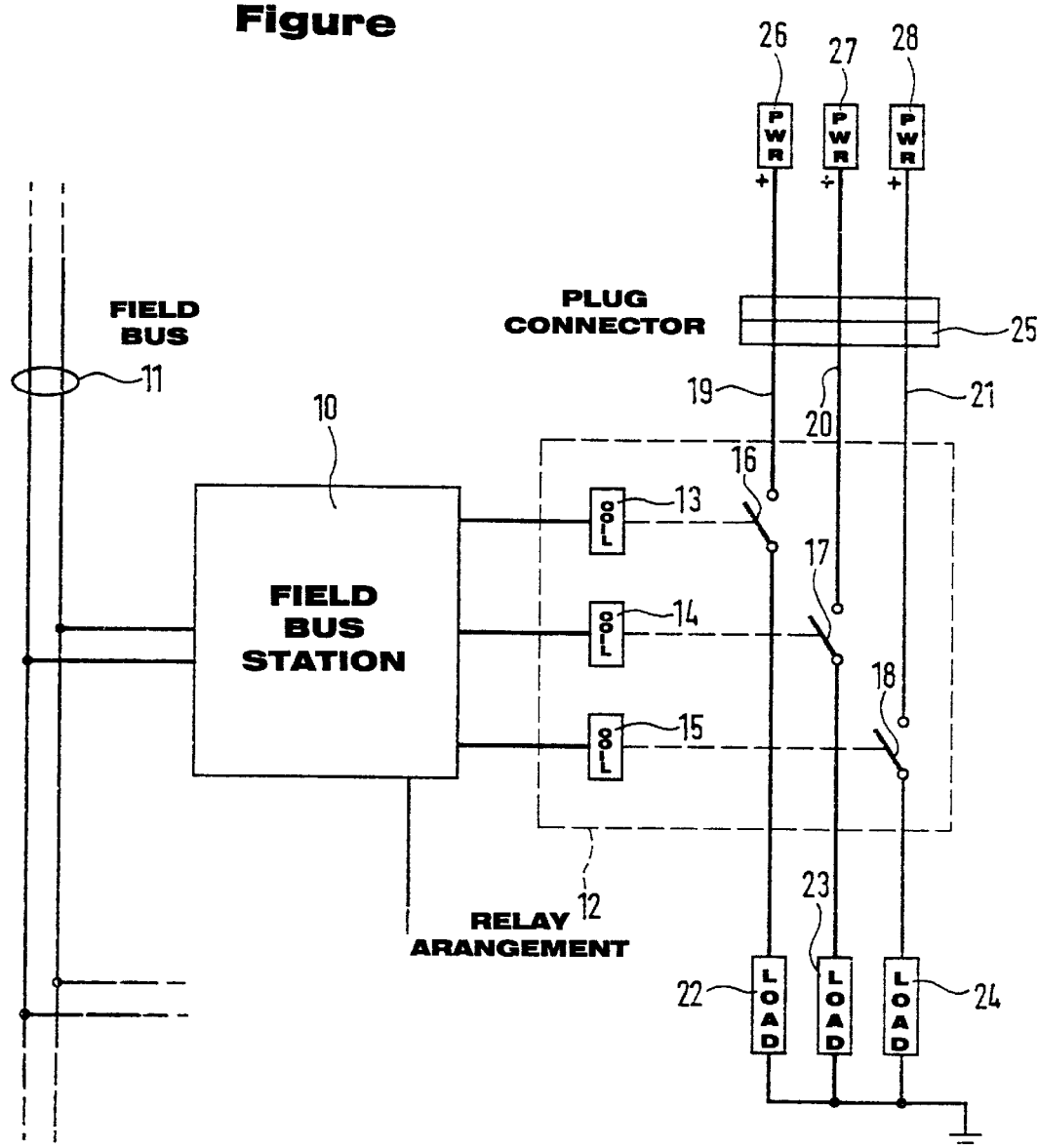

FIELD BUS ARRANGEMENT

This application is a continuation of Ser. No. 08/946,400, filed Oct. 7, 1997 and issued as U.S. Pat. No. 6,041,415.

BACKGROUND OF THE INVENTION

1. Field of the Invention

The invention relates to a field bus arrangement comprising at least one field bus station adapted to be connected with a serial field bus and at least one load adapted to be controlled by way of a control output of the field bus station.

2. Description of the Prior Art

Field bus arrangements for the serial control of spatially separate loads and load arrangements via field bus stations from a central control unit have been proposed in many different designs and variations, see for example the German patent publication 4,226,682 A, the German patent publication 3,631,477 A, the British patent publication 2,123,589 B or the periodical Elektronik 11, 3.6.1983, "Das lokale SP-Netzwerk", pages 73 through 78. In th case of the known arrangements in each case several field bus stations (or field bus nodes) are connected with the field bus consisting of customarily two or three lines by way of a central control unit. The same transmits serial data telegrams along the field bus and communicates via an address comprised in the data telegram with the field bus station assigned in the data telegram. In accordance with the control commands received such field bus station then directly controls, by way of control outputs, one or more of the connected loads. By way of the field bus there is then a transmission both of the control signals and also of the necessary electrical power for the supply of the field bus stations and for direct control of the loads. This means that there is on the one hand the need for elaborate and expensive field bus stations and on the other hand there is the danger of spurious activation of loads owing to defective data telegrams in the field bus, something which is unacceptable for many applications having high requirements as regards safety standards.

OBJECTS AND SUMMARY OF THE INVENTION

One object of the invention is accordingly to create field bus arrangements with simpler and less expensive field bus stations, in the case of which the possibility of complete decoupling of the power circuits exists.

In order to achieve these and/or other objects appearing from the present specification, claims and drawings, in the present invention the at least one load is connected by way of a controlled switch with a power supply line provided in addition to the lines of the field bus and the controlled switch is able to be operated by the control output of the field bus station.

In the design in accordance with the invention the lines of the field bus serve exclusively for data transmission, and in the field bus station itself no device for decoupling the power supply and data information is required. This leads to the desired simple and inexpensive field bus stations. In this respect for the field bus station itself it is irrelevant how large the current or voltage requirement of the load is. The power circuits are completely decoupled, that is to say for example that the load may be switched off both by way of the field bus station itself as well as by switching off the power supply line. This means that there is an inexpensive and reliable design. A further advantage is that the different loads may be connected with their own respective power supply lines and nevertheless may be controlled by way of a common field bus station.

The features recited in the dependent claims relate to advantageous further developments of and improvements in the field bus arrangement as claimed in claim 1.

It is preferred for a plurality of loads to be controlled via a corresponding number of control outputs of the field bus station, in which respect more particularly several power supply lines, which are able to be supplied with power independently from each other, are connected with the controlled switches. This leads to a complete decoupling of the loads from one another and from the field bus station. The power supply may be switched off independently from the field bus station, there being the advantageous possibility that a plurality of power supply lines may be switched off independently from each other so that for instance one load may not be switched on by switching off the corresponding power supply line even in the event of there being a spurious signal from the field bus station. The field bus structure is completely separated or isolated from the power supply side for the loads. This also provides the advantage that a plurality of loads, which require different power supply voltages, may be controlled by one field bus station.

The at least one power supply line is conveniently extended by way of a releasable plug connection with the loads so that by this provision as well a simple interruption, as for example a safety interruption, the supply voltage may be reached in order to switch off the load with a particularly high degree of reliability.

The at least one controlled switch is preferably designed in the form of a relay and more especially a reed relay, or as an opto-coupler switch.

By integration of the at least one controlled switch in the housing of the field bus station the amount of space required is kept extremely low. Nevertheless adaption to an extremely wide range of customer requirements is possible.

The field bus arrangement in accordance with the invention is more particularly suitable for the control of a plurality of pneumatic valves.

One embodiment of the invention is represented in the drawing and will be described in the following specification.

BRIEF DESCRIPTION OF THE DRAWINGS

The FIGURE is a block circuit diagram of a field bus station, connected with a field bus, for the control of three loads.

DETAILED DESCRIPTION OF THE PREFERRED EMBODIMENTS

The embodiment of the invention, illustrated in the, single figure, of a field bus arrangement comprises a field bus station 10, also termed a field bus node, which is connected with a field bus 11 comprising two lines. Lines are employed to diagrammatically indicate the possibility of connection of further field bus stations. Such a field bus 11 is also controlled in the initially mentioned prior art in an inherently known manner by means of a central station which is not illustrated. In principle it would also be possible to have, instead of one central station, one or more field bus stations in control of the others and adapted to perform control functions on same. The number of the lines of the field bus is able to be varied within certain limits and it is for example possible to provide three field bus lines as well.

On the output side the field bus station controls a relay arrangement 12, which comprises three relays. Accordingly three relay coils 13 through 15 drive three relay switches 16 through 18. These relay switches 16 through 18 are placed on power supply lines 19 through 21, which lead to three diagrammatically illustrated loads 22 through 24, such loads being for instance electrically driven pneumatic valves. Such valves have their respectively second terminal connected with ground or respectively with the respectively other pole of the power supply. On the other hand the power supply lines 19 through 21 lead by way of plug connector 25 to three power supply sources 26 through 28, where they are connected with the respective positive pole. The supply power sources 26 through 28 may also be completely decoupled from one another, that is to say the negative or ground terminal of the loads 22 through 24 can also be separately returned to the associated power supply source.

In a simpler design it is naturally also possible for a single power supply source to be provided, with which all power supply lines 19 through 21 are connected. This design will be adopted if a complete decoupling is unnecessary and all loads require the same power supply voltage. In the illustrated embodiment of the invention the power supply sources 26 through 28 may possess different power supply voltages.

For the control of the field bus stations the central station (not illustrated) transmits data telegrams by way of the field bus 11. Such telegrams each possess an address which is assigned to a certain field bus station 10. This field bus station then receives the data telegram and performs the commands contained therein. Such commands may involve the actuation, by way of the control outputs, of one or more relay coils 13 through 15 of the relay arrangement 12 in order to close the corresponding relay switches 16 through 18. If the power supply sources 26 through 28 are switched on such a closing then leads to the switching on of the respective load 22 through 24. For switching off switched on loads a further control command transmitted by way of the field bus 11 is then necessary, or a further possibility is for the field bus station 10 to comprise a timer arrangement and for the switch-on command to also comprise information about the time of switching on.

The number of relays in the relay arrangement 12 is naturally variable and for producing a compact design the relay arrangement 12 may also be integrated in the housing of the field bus station 10.

The relays of the relay arrangement 12 may for instance be in the form of reed relays or instead of the relay arrangement 12 it is possible for another arrangement of controlled switches, as for example opto-coupler switches to be employed.

By breaking the plug connection 25 reliable switching off of all loads is possible, independently of the control commands comprised in field bus station 10. Furthermore it is possible for switching off for safety to take place using an external power latching means, for instance by switching off one or more of the power supply sources 26 through 28.

What is claimed is:

1. A field bus arrangement comprising:
    a field bus station connectable to a serial field bus and capable of receiving instruction from the field bus and selectively generating a control signal;
    an electrically driven pneumatic valve;
    a relay operatively connected to the electrically driven pneumatic valve, the relay being selectively actuatable between an open and closed state by the control signal generated by the field bus station; and
    a valve energizing current path for providing current to the pneumatic valve, the current path being selectively interruptible independent of the control signal, such that current to the electrically driven pneumatic valve is terminated by modifying either the control signal or the valve energizing current path.

2. The field bus arrangement as defined in claim 1, wherein further including a plurality of pneumatic valves, a plurality of relays, each of said valves being actuatable by a corresponding relay selectively controllable by the field bus station.

3. The field bus arrangement as defined in claim 2, wherein the plurality of relays are integrated with the field bus station in a housing.

4. An apparatus for controlling the power to a load comprising:
    a switch having a power input, a control signal input and an output operatively connectable to the load, said switch being actuatable between an open and a closed position;
    at least one field bus station operatively connected to the control signal input of the switch, the field bus station generating a control signal which actuates the switch between the open and the closed position;
    a power signal independent of the control signal operatively connected to the power input of the switch for providing power to the load; and
    a connector operatively disposed between the power signal and the switch for permitting interruption of the power signal, whereby power to the load is controllable by the control signal and the power signal.

5. A field bus arrangement for controlling power to a plurality of loads comprising:
    a field bus station connectable to a serial field bus and capable of receiving instruction from the field bus and selectively generating a plurality of control signals;
    a plurality of switches operatively connected to the field bus and operatively connectable to the plurality of loads, each of the switches being selectively actuatable between an open and closed state by the control signal corresponding thereto to permit selective operation of the plurality of loads;
    a plurality of valve energizing circuit paths extending between a first and a second potential each being operatively connected to one of the plurality of switches and to one of the plurality of loads for providing power thereto, the plurality of valve energizing circuit paths each being electrically interruptible independent of the plurality of control signals, thereby allowing the plurality of loads to be controlled by either the control signals generated by the field bus station or by the valve energizing circuit paths.

6. The field bus arrangement as defined in claim 5, further including a power source operatively connected to each of the plurality of valve energizing circuit paths.

7. The field bus arrangement as defined in claim 5, further including a connector operatively disposed in the valve energizing circuit paths, the connector being movable to an open state to switch off the plurality of loads.

8. The field bus arrangement as defined in claim 7, wherein the connector is disposed in the valve energizing circuit paths at a point having a positive electrical potential.

9. The field bus arrangement as defined in claim 5, wherein the plurality of switches include opto-coupler switches.

10. The field bus arrangement as defined in claim 5, wherein the plurality of switches are integrated with the field bus station in a housing.

* * * * *